US012146651B1

(12) United States Patent
Cao

(10) Patent No.: US 12,146,651 B1
(45) Date of Patent: Nov. 19, 2024

(54) LUMINOUS OBJECT COMBINATION DEVICE AND COMBINATION METHOD

(71) Applicant: Kai Cao, Shenzhen (CN)

(72) Inventor: Kai Cao, Shenzhen (CN)

( * ) Notice: Subject to any disclaimer, the term of this patent is extended or adjusted under 35 U.S.C. 154(b) by 0 days.

(21) Appl. No.: 18/680,799

(22) Filed: May 31, 2024

(51) Int. Cl.
*F21V 33/00* (2006.01)
*A63B 5/22* (2006.01)
*F21L 4/02* (2006.01)
*F21V 21/088* (2006.01)

(52) U.S. Cl.
CPC .............. *F21V 33/008* (2013.01); *A63B 5/22* (2013.01); *F21L 4/02* (2013.01); *F21V 21/0885* (2013.01); *A63B 2225/74* (2020.08)

(58) Field of Classification Search
CPC ........................... F21V 21/088; F21V 21/0885
See application file for complete search history.

(56) References Cited

U.S. PATENT DOCUMENTS 4,974,129 A * 11/1990 Grieb ..................... B60Q 3/258 362/183
5,193,896 A * 3/1993 Oberlander ............... F21L 4/00 362/186
2008/0084690 A1 * 4/2008 Rappl ................. F21V 21/0832 362/184
2011/0211340 A1 * 9/2011 Smith ....................... F21L 4/04 362/191
2013/0182423 A1 * 7/2013 Matthews .................. B62J 6/03 362/191
2014/0268710 A1 * 9/2014 Murano .................... F16B 2/22 362/382
2018/0283629 A1 * 10/2018 Fisher ..................... F21S 8/086
2020/0229671 A1 * 7/2020 Cullins .............. A46B 15/0055

* cited by examiner

*Primary Examiner* — Alexander K Garlen

(57) ABSTRACT

The invention discloses a luminous object combination device and a combination method, in particular relating to the technical field of toys and supplies, comprising a luminous element, the top of the luminous element is connected with a lock fastening piece, and the bottom end of the luminous element is connected with a transparent cover. The bottom of the luminous element is located on the inside of the transparent cover and a plurality of luminous lamps are installed, a clamping mechanism is arranged between the top of the transparent cover and the bottom of the luminous element, and the inside of the luminous element is located above the transparent cover and a battery bin is arranged. The inside of the battery bin is installed with a dry battery. The combined device designed by the invention is suitable for installing on toy items, such as jumping balls, which is convenient for emitting light when used after combined installation, increases the functions of some items, is more beautiful and can warn passers-by. A combination method is designed, which is convenient to assemble and disassemble with other objects, and the combination operation is simple. It can be used to clamp the rope part of the jumping ball with different outer diameters, so as to improve the scope of application.

12 Claims, 11 Drawing Sheets

LUMINOUS OBJECT COMBINATION DEVICE AND COMBINATION METHOD

TECHNICAL FIELD

The invention relates to the technical field of toy articles, in particular to a luminous object combination device and a combination method.

BACKGROUND

Toys generally refer to objects that can be used to play which are often used as a way of entertaining and entertaining in human society. Toys can also be natural objects, that is, non-artificial things such as sand, stone, mud, branches, etc. Toys should be understood in a broad sense. It is not limited to things sold on the street for people to play with. Anything that can be played, seen, listened to and touched can be called toys.

The structure design of some toys on the existing market is relatively simple, such as jumping ball, when used, a ring is put on the ankle, and the other end is connected with a sphere, and a rotating force is applied to make the sphere rotate. The use process is relatively monotonous, and when used outdoors at night, on the one hand, it is not beautiful enough, on the other hand, it cannot warn passers-by, and it is easy to cause harm to passers-by. Therefore, it is necessary to design a luminous object installed on the toy to achieve this effect.

INVENTION CONTENT

In order to overcome the defects of the prior art, the invention provides a luminescent combination device and a combination method.

In order to realize the above purpose, the invention provides the following technical proposal: a luminous object combination device, comprising a luminous element, the top of the luminous element is connected with a locking member, and the bottom end of the luminous element is connected with a transparent cover. The bottom of the luminous element is arranged on the inside of the transparent cover with a plurality of luminous lamps, a clamping mechanism is arranged between the top of the transparent cover and the bottom of the luminous element, and a battery bin is arranged on the top of the transparent cover. The inside of the battery bin is arranged with a dry battery, the outside wall of the luminous element is arranged on the outside of the battery bin, and the outside wall of the luminous element is arranged with a first groove. The inside of the first groove is arranged with a control switch, the top of the luminous element is arranged with an arc groove, and the inside wall of the arc groove is fixed with a bump. The top end of the bump is fixed with a first arc splint, and the top two outer walls of the luminous element are arranged with a locking mechanism for fixing the locking member;

The locking member comprises an arc part arranged above the luminous member, a pin inserted at the top of the luminous member is arranged at both ends of the bottom of the arc part, a tooth groove is arranged on the outer wall of the pin, and a second arc splint corresponding to the position of the first arc splint is arranged on the inner side of the arc part, and a plurality of third springs are connected between the top of the second arc splint and the inner wall of the arc part.

As a further improvement of the technical proposal of the present invention, the clamping mechanism comprises a flange arranged on the bottom edge of the luminous element, two ends of the flange are provided with a limited position clamping rod, two outer walls of the top of the transparent cover are provided with a third groove on the outside of the limiting clamping rod, the other end of the two limiting clamping rods are fixed and connected with a movable plate on the inside of the flange, the inside of the flange is provided with a movable cavity in the horizontal direction corresponding to the outside of the movable plate, and a second spring is connected between the end of the movable plate and the inner wall of the movable cavity.

As a further improvement of the technical proposal of the present invention, the third groove is any one of square holes or circular holes, and the vertical cross section of the limiting clamping rod is any one of circular or rectangular holes.

As a further improvement of the technical proposal of the present invention, the top inner surface of the first arc splint and the bottom inner surface of the second arc splint are provided with anti-slip repouses, the connection mode between the two ends of the movable cavity and the inner wall of the arc part and the outer wall of the second arc splint is welded, and the top of the luminous member is provided with a slot for inserting pins.

As a further improvement of the technical proposal of the invention, the two locking mechanisms both include a fixed cavity arranged in the interior of the luminous member close to the outside of the tooth groove, the interior of the fixed cavity is provided with a movable clamping tooth block that is clamped with the pin, the top two outer walls of the luminous member are connected with a screw rod in the horizontal direction, the end of the screw rod extends to the middle outer wall of the movable clamping tooth block, the middle outer wall of the movable clamping tooth block is provided with a bearing seat, and the inner wall of the fixed cavity is connected with the outer wall of the movable clamping tooth block. A first spring is connected between the inner wall of the fixed cavity and the outer wall of the movable clamping tooth block.

As a further improvement of the technical proposal of the invention, second grooves are arranged at the end positions of the top two outer walls of the luminous element corresponding to the screw rod, and screw holes are arranged at the joint places of the top of the luminous element corresponding to the screw rod.

As a further improvement of the technical proposal of the present invention, the end portion of the movable clamping tooth block is provided with a tooth grain matching the tooth grain groove structure.

The invention discloses a combination method of a luminous object combination device, the steps of the combination method are as follows:

Step 1. Rotate the screw rod so that the screw rod is gradually moved to the outside, the first spring is in a deep compression state, the movable clamping tooth block is gradually moved to the outside, and the tooth grain of the movable clamping tooth block is separated from the tooth grain groove at the bottom of the pin;

Step 2: Take out the locking member from the top of the luminous member, then set the rope body of the object to be combined above the first arc splint, and insert two pins at the bottom of the locking member into the inside of the slot at the top of the luminous member;

Step 3. In the insertion process, the second arc splint at the bottom of the lock fastener gradually approaches and contacts the rope body part of the object to be combined until the rod body is compressed, and the third spring is in a compressed state at this time;

Step 4. Rotate the screw rod in reverse to make the screw rod move to the inner side gradually, and drive the movable clamping tooth block to move to the inner side, so that the tooth grain at the end of the movable clamping tooth block is clamped with the tooth grain groove on the pin, and the locking member is completed. Lock, at this time, the first spring is normally reset and is in a lightly compressed state;

Step 5. After the installation is completed, press the control switch to control the luminous lamp to work and emit light, and it can be used.

The combined device designed by the invention is suitable for installing on a toy, such as a jumping ball, which is convenient to emit light when used after combined installation, is more beautiful and can warn passers-by, and discloses a combined method, and has the following beneficial effects:

1. By setting the clamping mechanism, it is convenient to assemble and disassemble the transparent cover and the luminous element during use. By designing the opening of the third groove to be small, it is not easy to be affected by external interference or mis-contact, causing thrust on the limiting clamping rod, so that the transparent cover is not easy to fall off from the bottom of the luminous element. When it is necessary to disassemble, a small tool is used to apply force to the limiting clamping rod, so that the limiting clamping rod moves inward and compresses the second spring. After the limiting clamping rod leaves the third groove, the transparent cover can be taken off, and the same method is also suitable for the installation of the transparent cover;
2. The locking mechanism is provided for realizing the assembly and disassembly of the locking member and the luminous member. The assembly of the locking member is used for locking the rope body part of the combined object, and can be suitable for clamping the jumping ball rod part of different outer diameters to improve the scope of application. When operating, the screw rod is rotated to make the screw rod gradually move to the outside. The first spring is in a deep compression state, the movable clamping tooth block gradually moves to the outside, the tooth grain of the movable clamping tooth block is separated from the tooth grain groove at the bottom of the pin, and then the locking member is taken out from the top of the luminous member. The rope body of the combined object is placed above the first arc splint, and the two pins at the bottom of the locking member are inserted into the socket at the top of the luminous member. During the insertion process, the second arc splint at the bottom of the locking member is gradually approached and contacted with the rope body part of the combined object until the rod body is compressed. The third spring is in a compression state, rotates the screw rod in reverse, makes the screw rod gradually move to the inside, and drives the movable clamping tooth. The end tooth grain of the movable clamping tooth block is clamped with the tooth grain groove on the pin to complete the locking of the locking member. The first spring is normally reset and in a light compression state, so as to maintain the resistance to the movable clamping tooth block and improve the stability.

ILLUSTRATED DRAWINGS

Figure 1:
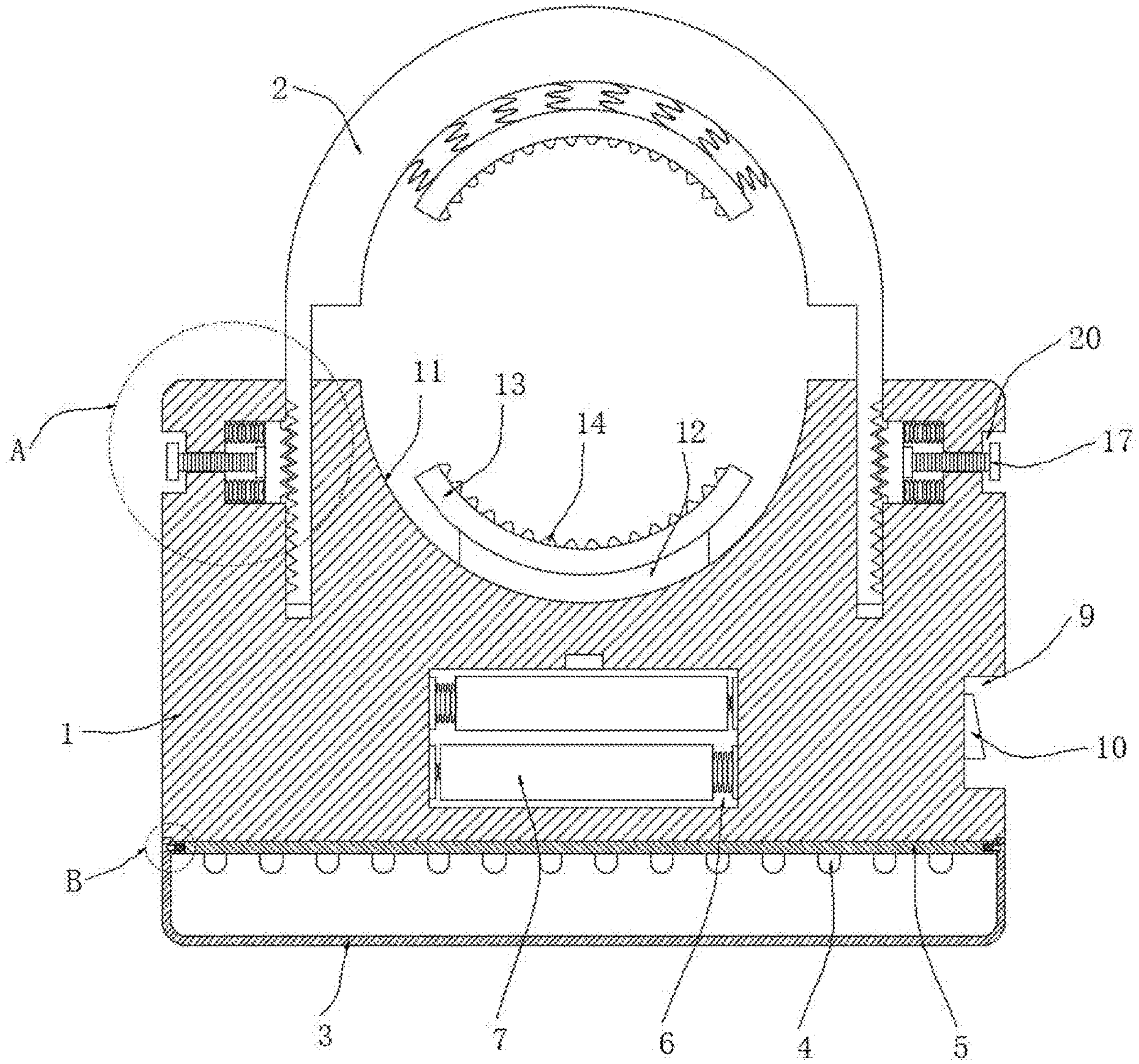
FIG. 1 is a sectional view of the present invention.
Figure 2:
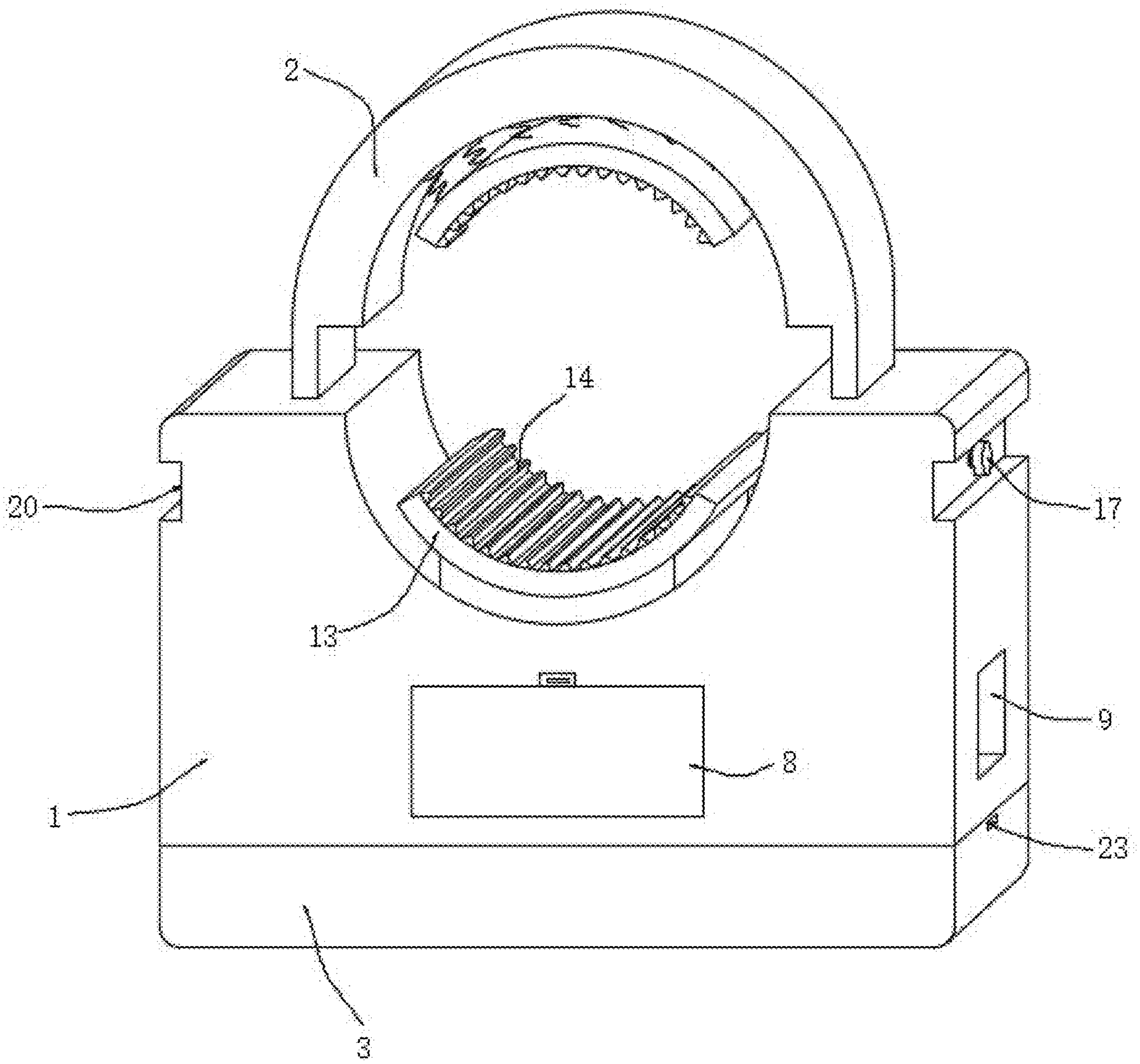
FIG. 2 is a schematic diagram of an exterior structure of the present invention.
Figure 3:
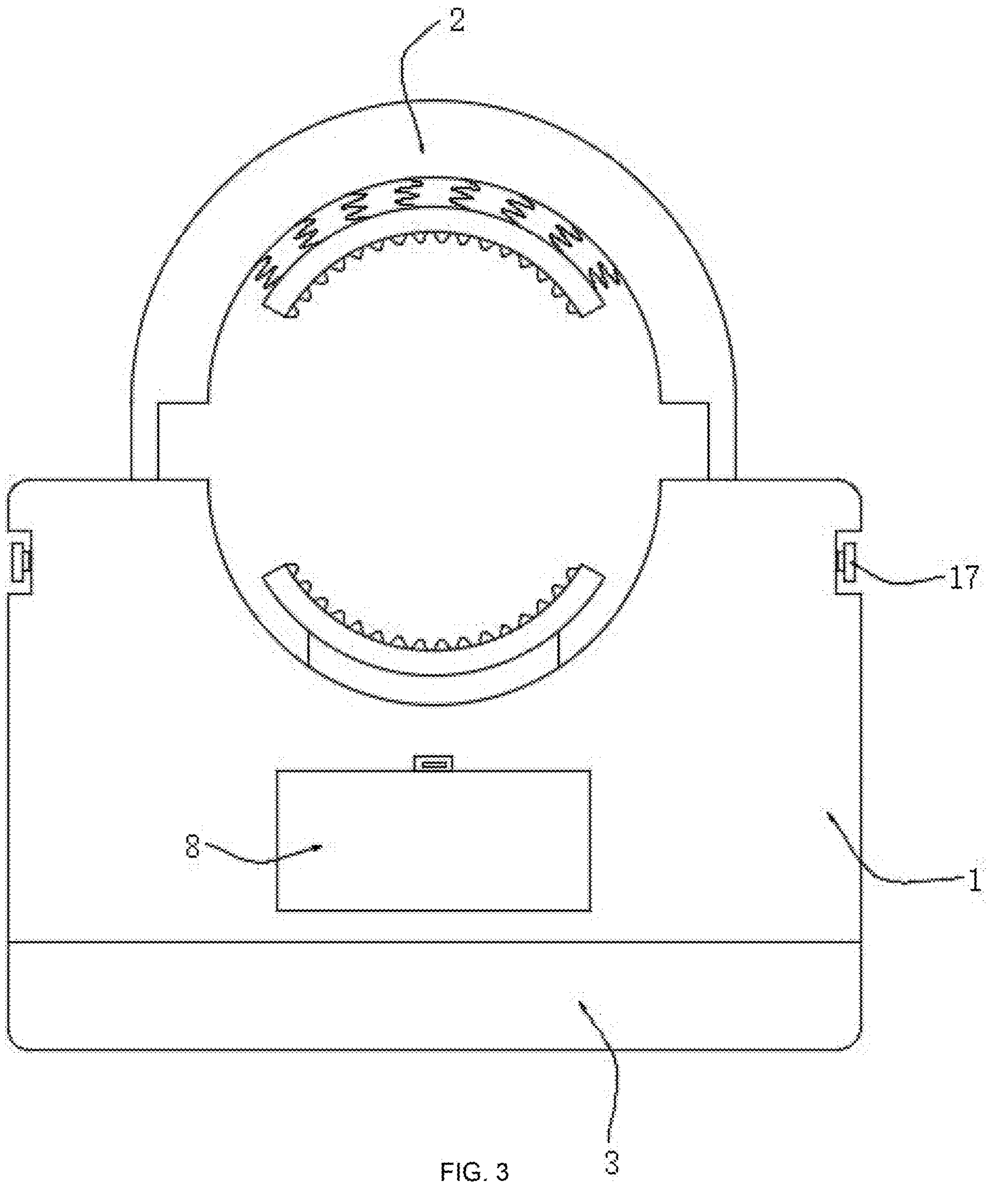
FIG. 3 is a master view of the present invention.
Figure 4:
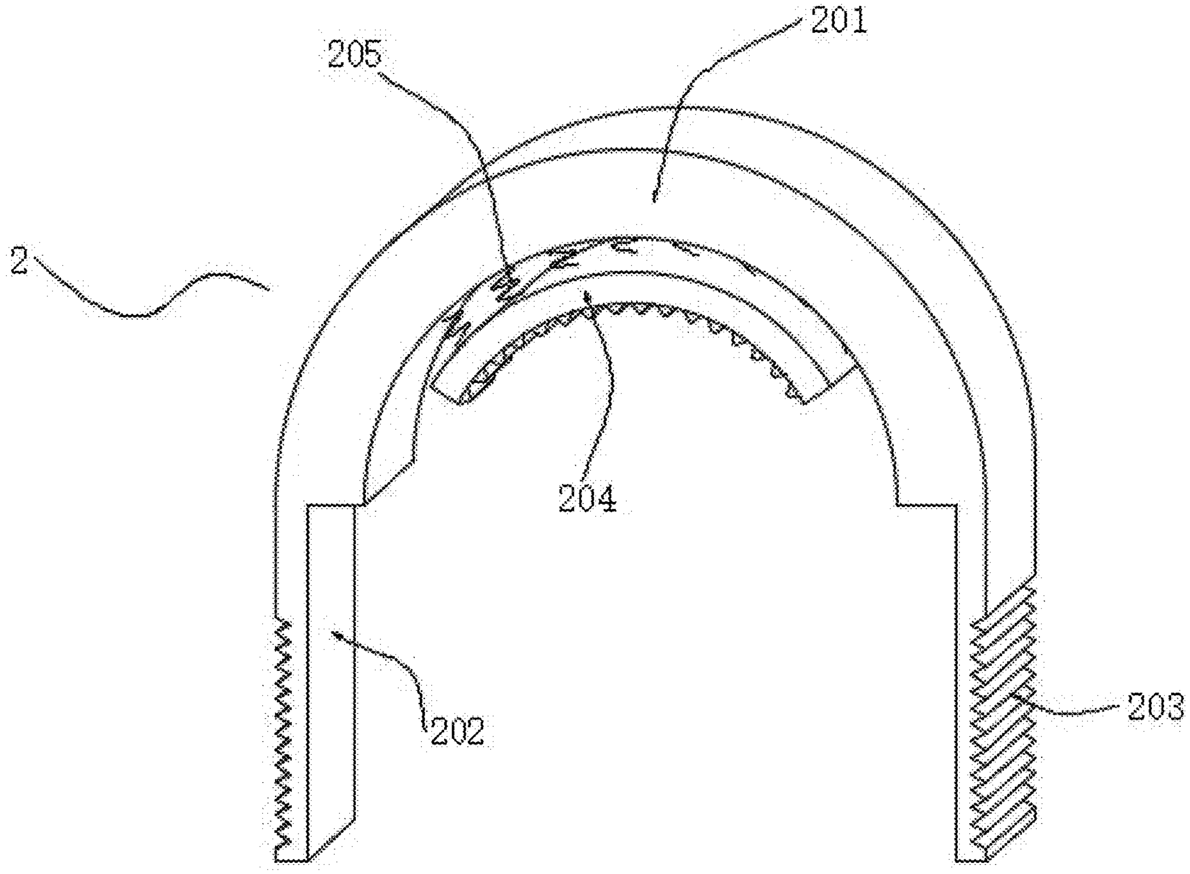
FIG. 4 is a schematic diagram of the structure of the lock fastener according to the present invention.
Figure 5:
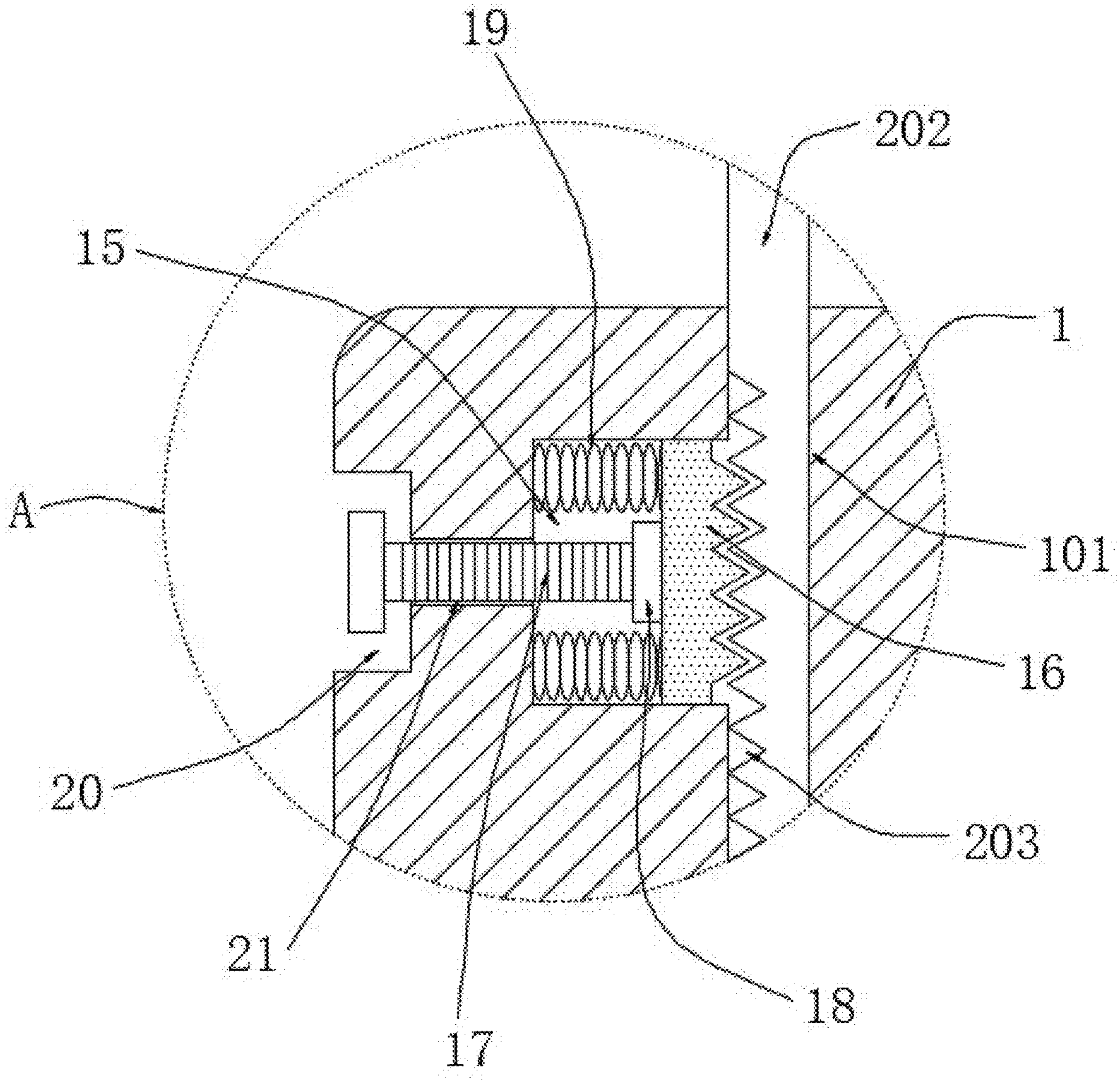
FIG. 5 is an enlarged view of section A of FIG. 1 of the present invention.
Figure 6:
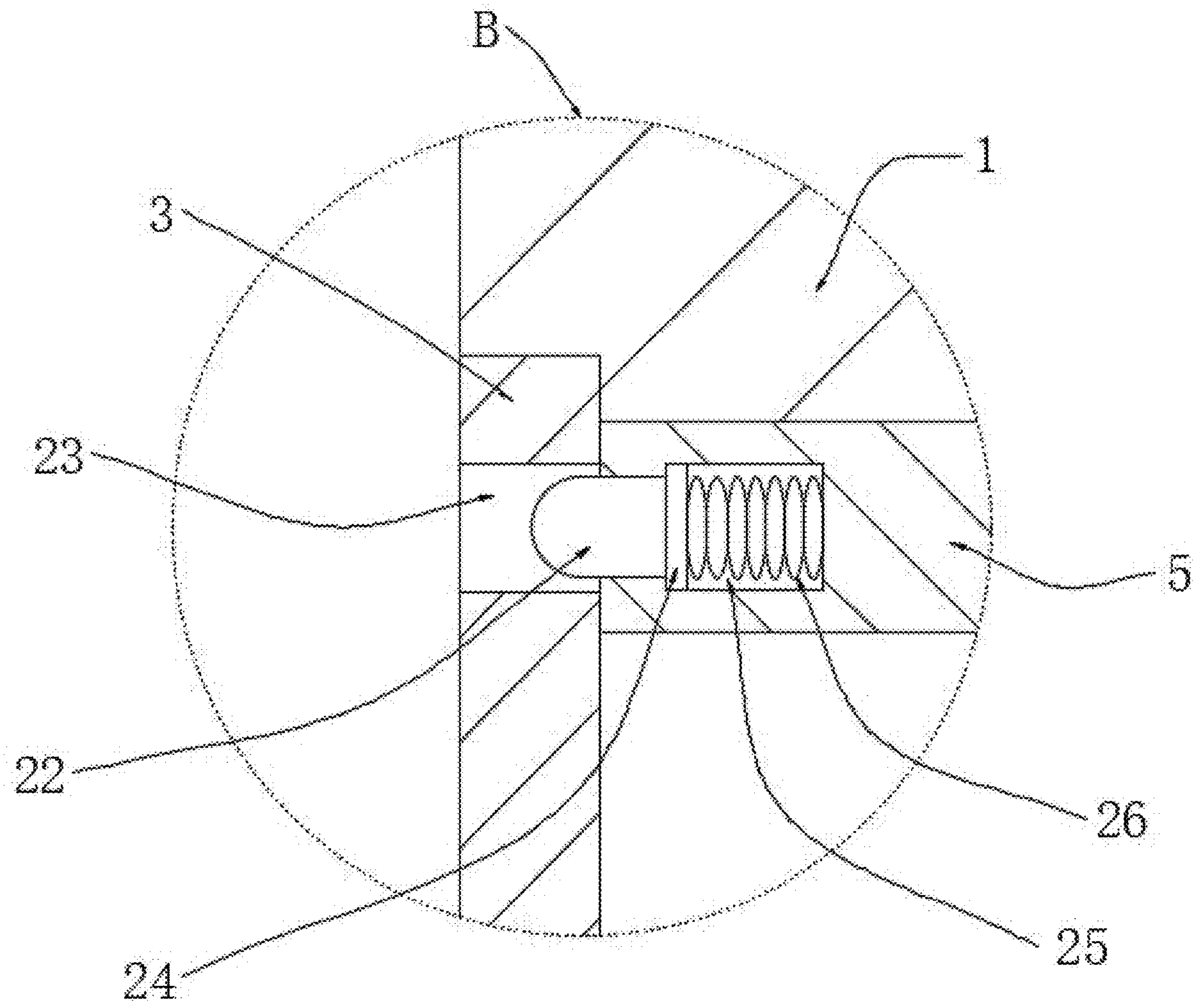
FIG. 6 is an enlarged view of section B of FIG. 1 of the present invention.

The attached drawings are marked: 1. Luminous members; 2. Locks and fasteners; 3. Transparent cover; 4. Luminous lamps; 5. Flange; 6. Battery bin; 7. Dry battery; 8. Battery bin cover; 9. A first groove; 10. Control switch; 11. Arc groove; 12, bump; 13. A first arc splint; 14. Non-slip repousse; 15. Fixed cavity; 16. Movable clamping tooth block; 17. Screw; 18. Bearing seat; 19. A first spring; 20. A second groove; 21. Screw hole; 22. Limit lever; 23. Third groove; 24. Movable board; 25. Movable cavity; 26. Second spring; 101. Slots; 201. Arc parts; 202, prongs; 203. Tooth groove; 204. Second arc splint; 205. Third spring.

SPECIFIC IMPLEMENTATION MODE

The technical proposal in the embodiment of the present invention will be clearly and completely described with reference to the drawings in the embodiment of the present invention. Obviously, the embodiments described are only some embodiments of the present invention, but not all embodiments. Based on the embodiments of the present invention, all other embodiments obtained without creative effort by those of ordinary skill in the art fall within the scope of protection of the present invention.

As shown in FIGS. 1-11, a luminous object combination device comprises a luminous member 1, a locking member 2 is connected to the top of the luminous member 1, and a transparent cover 3 is connected to the bottom of the luminous member 1. A plurality of luminous lamps 4 are installed on the inside of the transparent cover 3, a clamping mechanism is arranged between the top of the transparent cover 3 and the bottom of the luminous member 1. A battery bin 6 is arranged on the top of the transparent cover 3, a dry battery 7 is installed on the inside of the battery bin 6, and an outer wall of the luminous member 1 is connected on the outside of the battery bin 6. A first groove 9 is arranged on the bottom outer wall of the luminous member 1, a control switch 10 is arranged on the inside of the first groove 9, and an arc groove 11 is arranged on the top of the luminous member 1. A bump 12 is fixedly connected on the inner wall of the arc groove 11, a bump 12 is fixedly connected on the top end of the bump 12 is fixedly connected on the top end of the luminous member 1, and a locking mechanism for fixing the lock 2 is arranged on both top outer walls of the luminous member 1;

The locking member 2 includes an arc member 201 disposed above the luminous member 1, a pin 202 inserted at the top of the luminous member 1 is provided at both ends of the bottom of the arc member 201, a toothed groove 203 is provided on the outer wall of the pin 202, a second arc splint 204 corresponding to the position of the first arc splint 13 is provided on the inner side of the arc member 201, and a plurality of third springs 205 are connected between the top of the second arc splint 204 and the inner wall of the arc member 201.

As shown in FIGS. 1-3 and 6, the clamping mechanism includes a flange 5 provided at the bottom edge of the luminous member 1, a finite clamping rod 22 is provided at both ends of the flange 5, and a third groove 23 is provided at the exterior of the limiting clamping rod 22 on the top two outer walls of the transparent cover 3. A movable plate 24 is fixedly connected at the interior of the flange 5, a movable cavity 25 is provided in the horizontal direction corresponding to the exterior of the movable plate 24, and a second spring 26 is connected between the end of the movable plate 24 and the inner wall of the movable cavity 25. The third groove 23 is any one of square holes or circular holes, and the vertical cross section of the limiting clamping rod 22 is any one of circular or rectangular.

The clamping mechanism provided is convenient for assembling and disassembling the transparent cover 3 and the luminous member 1 when in use. The opening of the third groove 23 is designed to be small, so that it is not easy to be affected by external interference or mis-contact, which will cause a thrust on the limiting lever 22, so that the transparent cover 3 is not easy to fall off from the bottom of the luminous member 1. When it is necessary to disassemble, a small tool is used to apply force to the limiting lever 22, so that the limiting lever 22 moves inwardly and compresses the second spring 26. After the limiting lever 22 is separated from the third groove 23, the transparent cover 3 can be removed. The same method is also applicable to the installation of the transparent cover 3.

As shown in FIGS. 1-5, the top inner surface of the first arc splint 13 and the bottom inner surface of the second arc splint 204 are provided with an anti-slip rig 14, which facilitates the improvement of the anti-slip performance at the contact position, the improvement of the friction force, and the improvement of the stability of the clamping. Both ends of the movable cavity 25 are connected to the inner wall of the arc member 201 and the outer wall of the second arc splint 204 by welding. A slot 101 for inserting the pins 202 is provided at the top of the luminous member 1.

As shown in FIGS. 1-5, the two locking mechanisms each include a fixed cavity 15 arranged in the interior of the luminous member 1 near the outside of the toothed groove 203, a movable clamping tooth block 16 engaged with the pin 202 is provided inside the fixed cavity 15, and a screw 17 is connected to the top two outer walls of the luminous member 1 in a horizontal direction. An end of the screw 17 extends to the middle outer wall of the movable clamping tooth block 16, a bearing seat 18 is provided at the end position of the screw 17 corresponding to the middle outer wall of the movable clamping tooth block 16, and a first spring 19 is connected between the inner wall of the fixed cavity 15 and the outer wall of the movable clamping tooth block 16. A second groove 20 is provided at the end position of the screw 17 corresponding to the top two outer walls of the luminous member 1, and a screw hole 21 is provided at the connection of the top two outer walls of the luminous member 1 corresponding to the toothed groove 203, and a tooth groove matching the structure of the toothed groove 203 is provided at the end of the movable clamping tooth block 16.

Figure 9:
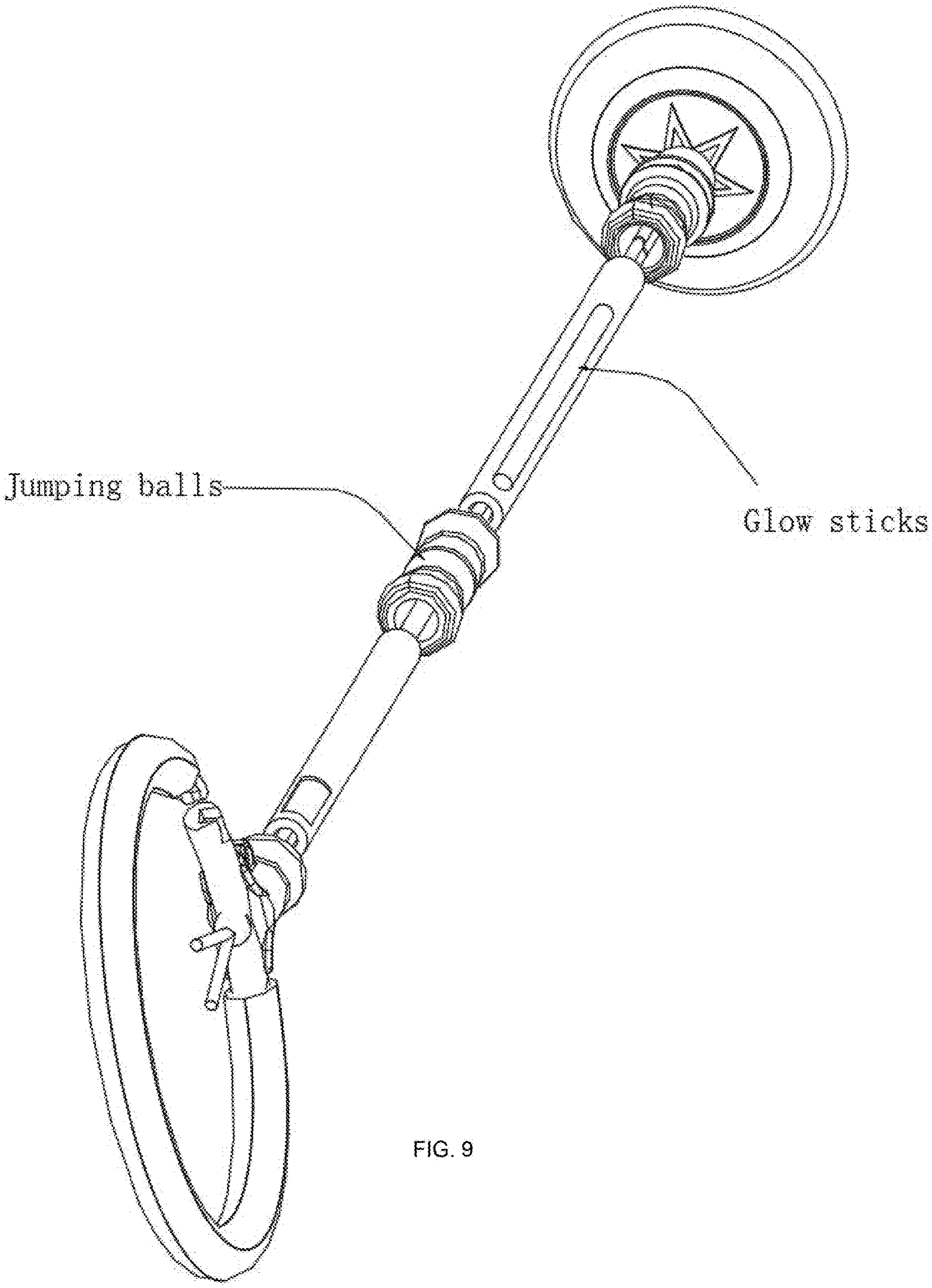
FIG. 9 is a schematic diagram illustrating the combination of a jumper ball and a fluorescent rod according to the present invention.
Figure 10:
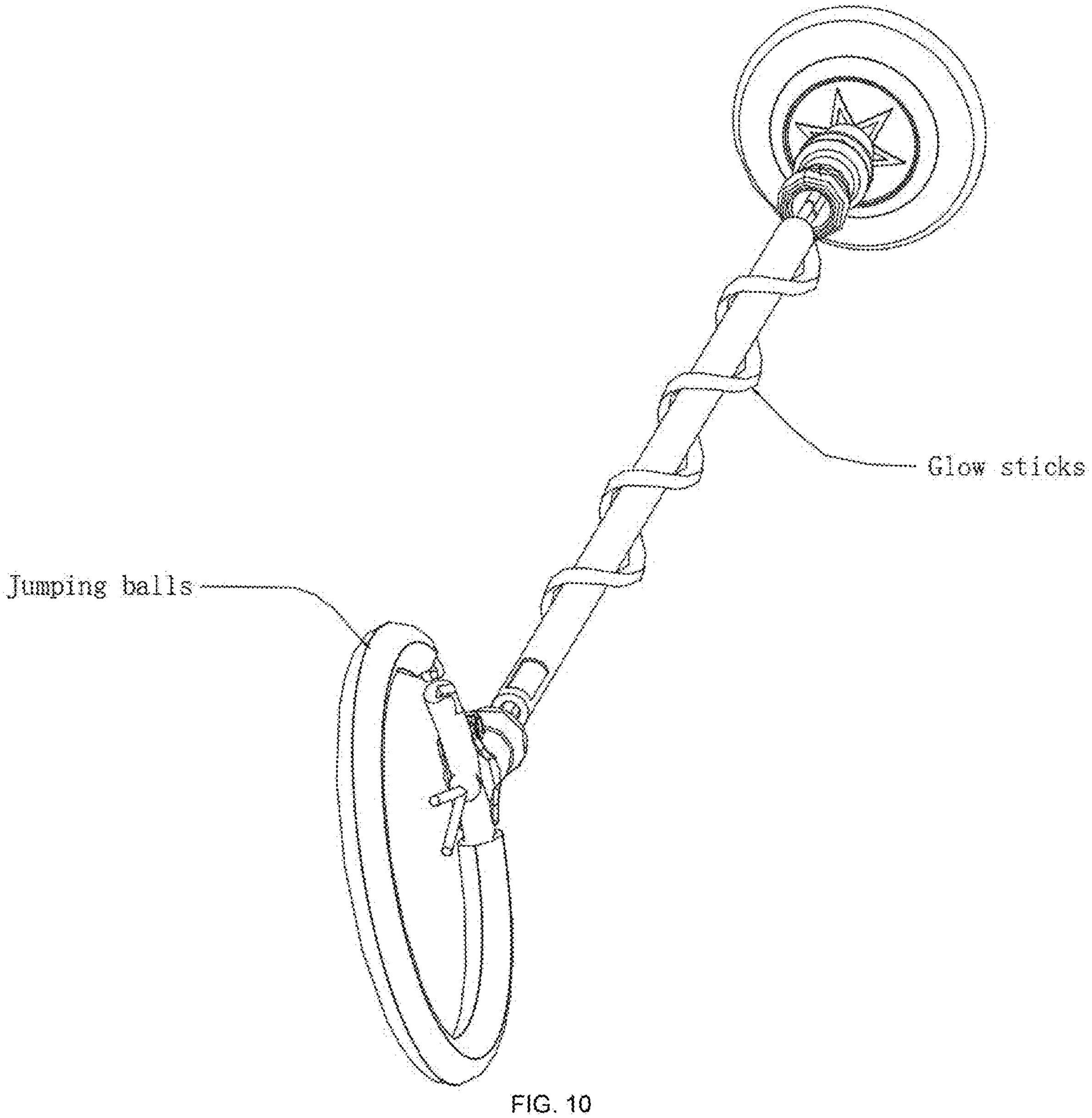
FIG. 10 is a schematic diagram illustrating the combination of a jumper ball and a fluorescent rod according to the present invention.

The locking mechanism is provided for realizing the assembly and disassembly of the locking member 2 and the luminous member 1. The assembly of the locking member 2 is used for locking the rope body part of the combined object. When operating, the screw rod 17 is rotated to make the screw rod 17 gradually move to the outside, the first spring 19 is in a deep compression state, the movable clamping tooth block 16 gradually moves to the outside, the tooth grain of the movable clamping tooth block 16 is removed from the tooth grain groove 203 at the bottom of the pin 202. The locking member 2 is taken out from the top of the luminous member 1. The rope body of the combined object is placed above the first arc clamping plate 13, and the two pins 202 at the bottom of the locking member 2 are inserted into the socket 101 at the top of the luminous member 1. During the insertion process, the second arc clamping plate 204 at the bottom of the locking member 2 is gradually approached and contacted with the rod body part of the combined object until the rod body is compressed. The third spring 205 is in a compressed state, rotates the screw 17 in reverse, causes the screw 17 to gradually move inwardly, and drives the movable clamping tooth block 16 to move inwardly, so that the tooth grain at the end of the movable clamping tooth block 16 is engaged with the tooth grain groove 203 on the pin 202, and the locking member 2 is completed. The first spring 19 is normally reset and is in a lightly compressed state, so that the resistance force against the movable clamping tooth block 16 is maintained, and the stability of the movable clamping tooth block 16 is improved As shown in FIG. 9, the fluorescent stick is clamped and mounted on the jumping ball toy, so that the protection range of the entire device can be expanded.

Figure 11:
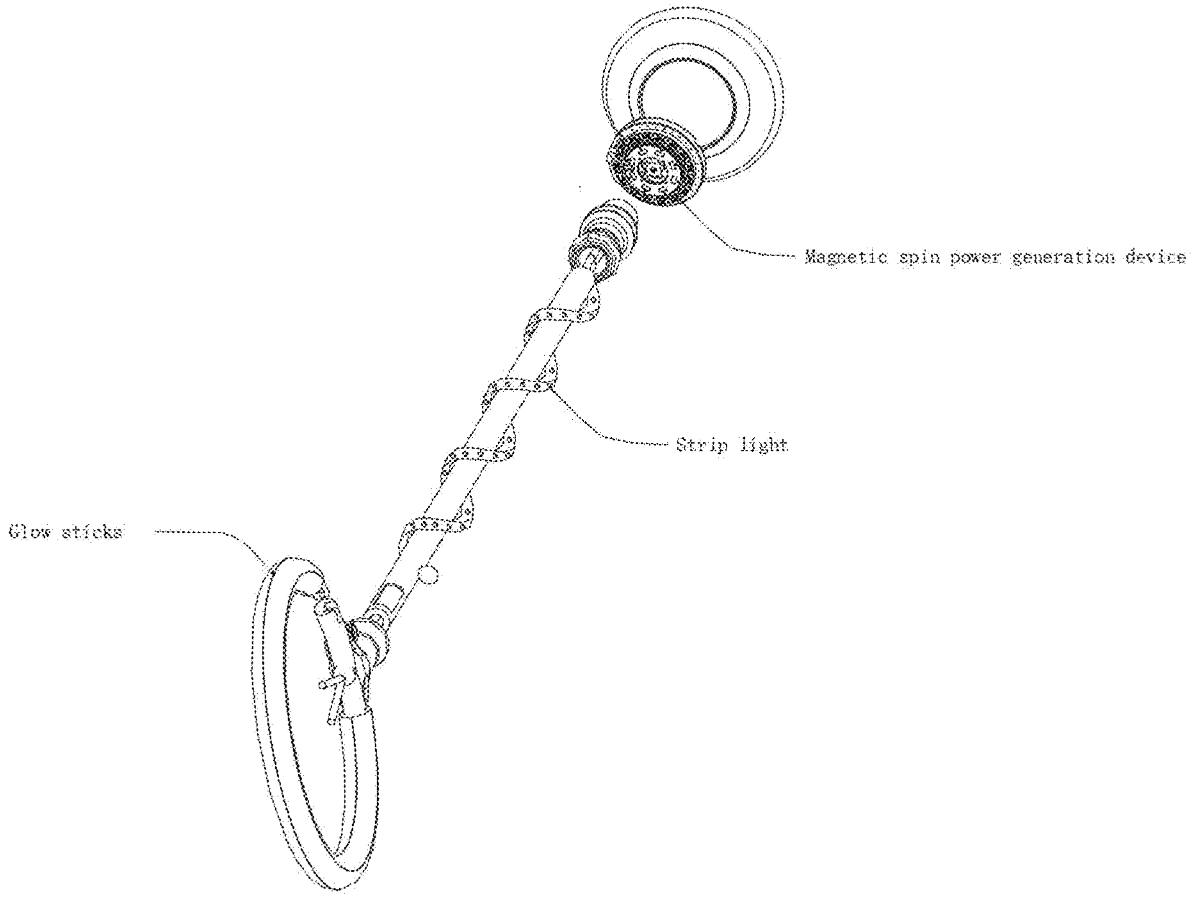
FIG. 11 is a schematic diagram showing a combination of a jumper ball and a light strip according to the present invention.

As shown in FIG. 11, the light strip is wound and assembled on the jumping ball toy, and is used for supplying electric power in conjunction with the upper magnetic rotary power generation device.

Figure 7:
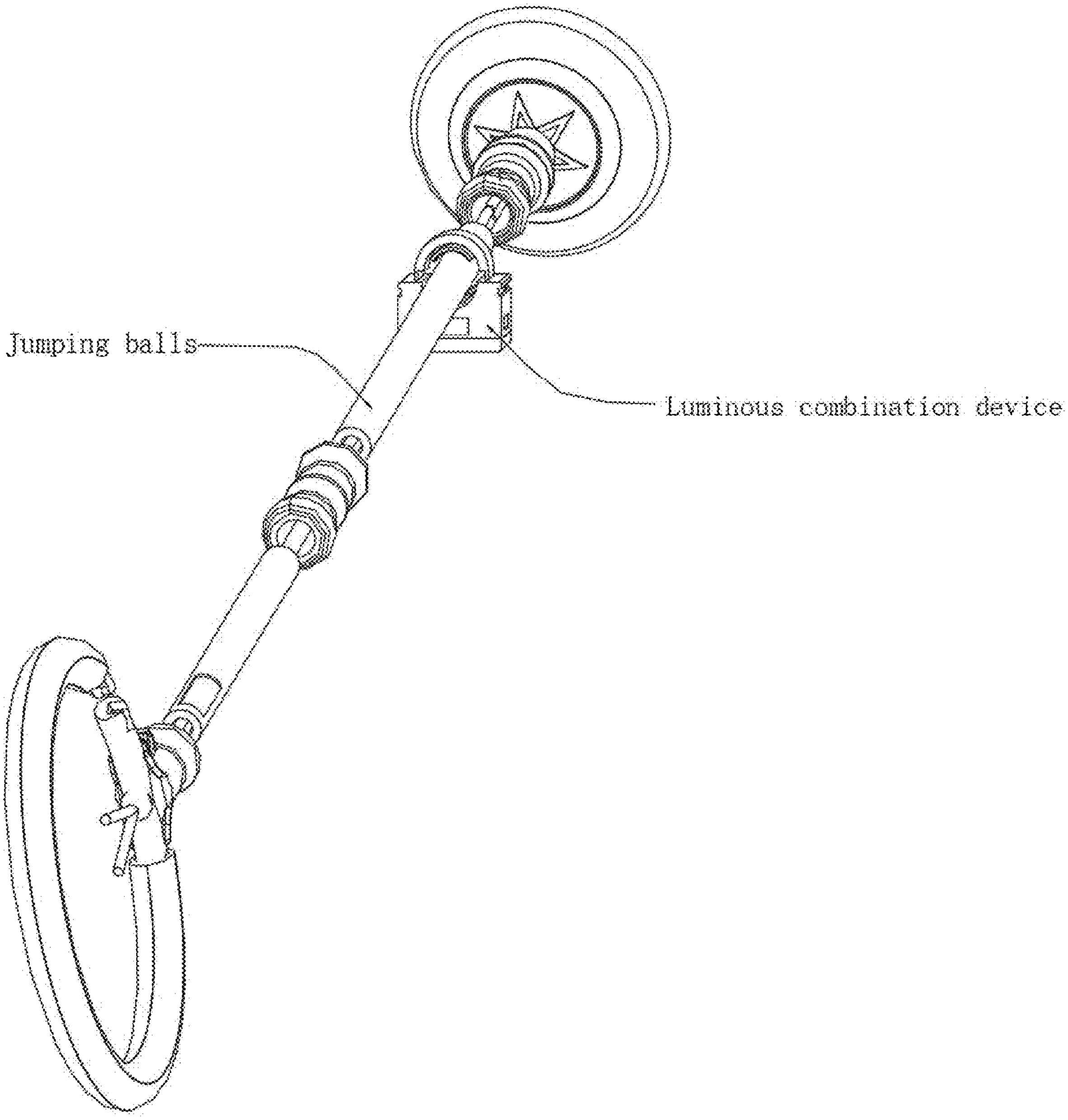
FIG. 7 is a schematic diagram illustrating the combination of the luminous object combination device and the jumping ball of the present invention.
Figure 8:
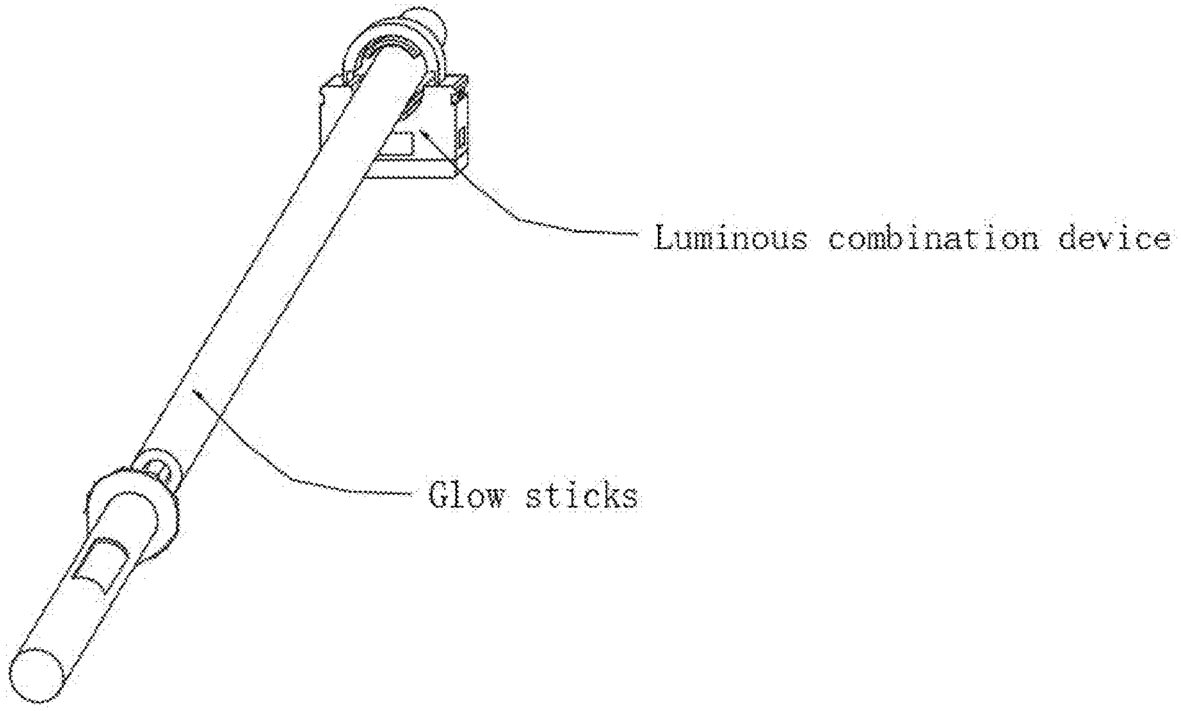
FIG. 8 is a schematic diagram showing a combination of a luminescent combination device and a fluorescent rod according to the present invention.

As shown in FIGS. 7-8, respectively, schematic diagrams of assembling the luminescent combination device with a jumping ball and a fluorescent stick, the present invention shows, by taking FIGS. 7-8 as an example, a manner of assembling the luminescent combination device with a toy structure of the present invention, including but limited to a jumping ball and a fluorescent stick toy.

The invention relates to a combination method of a luminous object combination device. Taking a jumping ball as an example, the steps of the combination method are as follows:

Step 1. The screw 17 is rotated so that the screw 17 is gradually moved outwardly, the first spring 19 is in a deep compression state, the movable clamping tooth block 16 is gradually moved outwardly, and the tooth grain of the movable clamping tooth block 16 is separated from the tooth grain groove 203 at the bottom of the pin 202;

Step 2. The locking member 2 is taken out from the top of the luminous member 1, and then the jumping ball end rope body to be combined is placed above the first arc splint 13, and the two pins 202 at the bottom of the locking member 2 are inserted inside the slot 101 at the top of the luminous member 1;

Step 3. During the insertion process, the second arc splint 204 at the bottom of the locking member 2 gradually approaches and contacts the rope body portion of the end portion of the jumping ball to be combined until the rod body is pressed, and at this time the third spring 205 is in a compressed state;

Step 4. Rotate the screw 17 in reverse to make the screw 17 gradually move inwardly, and drive the movable clamping tooth block 16 to move inwardly, so that the tooth grain at the end of the movable clamping tooth block 16 is engaged with the tooth grain groove 203 on the pin 202, and the locking member 2 is completed. The first spring 19 is normally reset and is in a lightly compressed state;

Step 5. After the installation is completed, press the control switch 10 to control the luminous lamp 4 to work and emit light, and the luminous lamp 4 can be used.

The first arc splint 13 and the second arc splint 204 are used for clamping the rod portion of the jumping ball. The second arc splint 204 is equipped with a third spring 205, which can be compressed during the clamping process. That is, the second arc splint 204 has a movable stroke, and can be suitable for clamping the rope portion of the jumping ball with different outer diameters, so as to improve the scope of application.

The drawings of the disclosed embodiments of the present invention only refer to the structures related to the disclosed embodiments, other structures can refer to the usual design, and the same embodiment and different embodiments of the present invention can be combined with each other under the condition of no conflict;

Finally, the foregoing is only a preferred embodiment of the present invention and is not intended to limit the present invention. Any modification, equivalent replacement, improvement, etc. made within the spirit and principles of the present invention should be included in the scope of protection of the present invention.

What is claimed is:

1. A luminous object combination device comprising: a luminous member, a top of the luminous member is connected with a locking member, and a bottom of the luminous member is connected with a transparent cover; the bottom of the luminous member is arranged on an inside of the transparent cover, a plurality of luminous lamps are arranged between a top of the transparent cover and the bottom of the luminous member; a battery bin is arranged on the top of the transparent cover, an inside of the battery bin is arranged with a dry battery, and an outer wall of the luminous member is located outside the battery bin and is connected with a battery bin cover; an outside wall of the bottom of the luminous member is arranged with a first groove, an inside of the first groove is arranged with a control switch, and the top of the luminous member is arranged with an arc groove; an inside wall of the arc groove is fixed with a bump, a top end of the bump is fixedly connected with a first arc splint, and the two top outer walls of the luminous member are provided with locking mechanisms for fixing a locking member; the locking member comprises an arc member arranged above the luminous member, a pin inserted at the top of the luminous member is arranged at both ends of a bottom of the arc member, and a tooth groove is arranged on an outer wall of the pin; a second arc splint corresponding to a position of the first arc splint is arranged on an inner side of the arc member, and a plurality of the third springs are connected between a top of the second arc splint and an inner wall of the arc member.

2. The luminous object combination device according to claim 1, wherein a clamping mechanism comprises: a flange arranged at a bottom edge of the luminous member, two ends of the flange are provided with limiting clamping rods, two outer walls of the top of the transparent cover are provided with third grooves on the exterior of the limiting clamping rods, two other ends of the limiting clamping rods are fixed on an interior of the flange and are provided with a movable plate, the interior of the flange corresponds to an exterior of the movable plate and is provided with a movable cavity in a horizontal direction, and a second spring is connected between an end of the movable plate and an inner wall of the movable cavity.

3. The luminescent combination device according to claim 2, wherein each of the third grooves are any one of a square hole or a circular hole, and a vertical cross section of each of the limiting clamping rods are any one of a circular or a rectangular shape.

4. The luminous object combination device according to claim 1, wherein a top inner surface of the first arc splint and a bottom inner surface of the second arc splint are provided with anti-slip repouses, the connection mode between two ends of the movable cavity and the inner wall of the arc member and an outer wall of the second arc splint is welded, and the top of the luminous member is provided with a slot for inserting the pin.

5. The luminous object combination device according to claim 1, wherein both of the locking mechanisms comprise a fixed cavity arranged inside the luminous member near an outside of the tooth groove, a movable clamping tooth block engaged with each pin is arranged inside the fixed cavity, a screw rod is connected to the top two outer walls of the luminous member in a horizontal direction, the end of the screw rod extends to a middle outer wall of the movable clamping tooth block, a bearing seat is arranged at an end position of the middle outer wall of the movable clamping tooth block corresponding to the screw rod, and a first spring is connected between an inner wall of the fixed cavity and the middle outer wall of the movable clamping tooth block; an end portion of the movable clamping tooth block is provided with tooth grooves that match the structure of the tooth groove.

6. The luminous object combination device according to claim 5, wherein second grooves are provided at the end positions of the top two outer walls of the luminous member corresponding to the screw rod, and a screw hole is provided at the connection of the top of the luminous member corresponding to the screw rod.

7. A combining method using the luminous object combination device according to claim 1, wherein the combining method steps are as follows: Step 1, the screw rod is rotated so that the screw rod is gradually moved outward, the first spring is in a deep compression state, the movable clamping tooth block is gradually moved outward, and the tooth grain of the movable clamping tooth block is separated from the tooth grain groove at the bottom of the pin; Step 2, Take out the locking member from the top of the luminous member, then set a rope body of the object to be combined above the first arc splint, and insert two pins at the bottom of the locking member into the inside of a slot at the top of the luminous member; Step 3, During the insertion process, the second arc splint at a bottom of the locking member gradually approaches and contacts the rope body part of the object to be combined until the rod body is compressed, and at this time the third springs are in a compressed state; Step 4, Rotate the screw rod in reverse, so that the screw rod is gradually moved inwardly, and drive the movable clamping tooth block to move inwardly, so that the tooth grain at the end of the movable clamping tooth block is clamped with the tooth grain groove on the pin, and the locking member is completed; the first spring is reset and is in a lightly compressed state; Step 5, After the installation is completed, press the control switch to control the luminous lamps to work to emit light, and the combination device can be used.

8. A combining method using the luminous object combination device according to claim 2, wherein the combining method steps are as follows: Step 1, the screw rod is rotated so that the screw rod is gradually moved outward, the first spring is in a deep compression state, the movable clamping tooth block is gradually moved outward, and the tooth grain of the movable clamping tooth block is separated from the tooth grain groove at the bottom of the pin; Step 2, Take out the locking member from the top of the luminous member, then set a rope body of the object to be combined above the first arc splint, and insert two pins at the bottom of the locking member into the inside of a slot at the top of the luminous member; Step 3, During the insertion process, the second arc splint at a bottom of the locking member gradually approaches and contacts the rope body part of the object to be combined until the rod body is compressed, and at this time the third springs are in a compressed state; Step 4, Rotate the screw rod in reverse, so that the screw rod is gradually moved inwardly, and drive the movable clamping tooth block to move inwardly, so that the tooth grain at the end of the movable clamping tooth block is clamped with the tooth grain groove on the pin, and the locking member is completed; the first spring is reset and is in a lightly compressed state; Step 5, After the installation is completed, press the control switch to control the luminous lamps to work to emit light, and the combination device can be used.

9. A combining method using the luminous object combination device according to claim 3, wherein the combining method steps are as follows: Step 1, the screw rod is rotated so that the screw rod is gradually moved outward, the first spring is in a deep compression state, the movable clamping tooth block is gradually moved outward, and the tooth grain of the movable clamping tooth block is separated from the tooth grain groove at the bottom of the pin; Step 2, Take out the locking member from the top of the luminous member, then set a rope body of the object to be combined above the first arc splint, and insert two pins at the bottom of the locking member into the inside of a slot at the top of the luminous member; Step 3, During the insertion process, the second arc splint at a bottom of the locking member gradually approaches and contacts the rope body part of the object to be combined until the rod body is compressed, and at this time the third springs are in a compressed state; Step 4, Rotate the screw rod in reverse, so that the screw rod is gradually moved inwardly, and drive the movable clamping tooth block to move inwardly, so that the tooth grain at the end of the movable clamping tooth block is clamped with the tooth grain groove on the pin, and the locking member is completed; the first spring is reset and is in a lightly compressed state; Step 5, After the installation is completed, press the control switch to control the luminous lamps to work to emit light, and the combination device can be used.

10. A combining method using the luminous object combination device according to claim 4, wherein the combining method steps are as follows: Step 1, the screw rod is rotated so that the screw rod is gradually moved outward, the first spring is in a deep compression state, the movable clamping tooth block is gradually moved outward, and the tooth grain of the movable clamping tooth block is separated from the tooth grain groove at the bottom of the pin; Step 2, Take out the locking member from the top of the luminous member, then set a rope body of the object to be combined above the first arc splint, and insert two pins at the bottom of the locking member into the inside of the slot at the top of the luminous member; Step 3, During the insertion process, the second arc splint at a bottom of the locking member gradually approaches and contacts the rope body part of the object to be combined until the rod body is compressed, and at this time the third springs are in a compressed state; Step 4, Rotate the screw rod in reverse, so that the screw rod is gradually moved inwardly, and drive the movable clamping tooth block to move inwardly, so that the tooth grain at the end of the movable clamping tooth block is clamped with the tooth grain groove on the pin, and the locking member is completed; the first spring is reset and is in a lightly compressed state; Step 5, After the installation is completed, press the control switch to control the luminous lamps to work to emit light, and the combination device can be used.

11. A combining method using the luminous object combination device according to claim 5, wherein the combining method steps are as follows: Step 1, the screw rod is rotated so that the screw rod is gradually moved outward, the first spring is in a deep compression state, the movable clamping tooth block is gradually moved outward, and the tooth grain of the movable clamping tooth block is separated from the tooth grain groove at the bottom of the pin; Step 2, Take out the locking member from the top of the luminous member, then set a rope body of the object to be combined above the first arc splint, and insert two pins at the bottom of the locking member into the inside of a slot at the top of the luminous member; Step 3, During the insertion process, the second arc splint at a bottom of the locking member gradually approaches and contacts the rope body part of the object to be combined until the rod body is compressed, and at this time the third springs are in a compressed state; Step 4, Rotate the screw rod in reverse, so that the screw rod is gradually moved inwardly, and drive the movable clamping tooth block to move inwardly, so that the tooth grain at the end of the movable clamping tooth block is clamped with the tooth grain groove on the pin, and the locking member is completed; the first spring is reset and is in a lightly compressed state; Step 5, After the installation is completed, press the control switch to control the luminous lamps to work to emit light, and the combination device can be used.

12. A combining method using the luminous object combination device according to claim 6, wherein the combining method steps are as follows: Step 1, the screw rod is rotated so that the screw rod is gradually moved outward, the first spring is in a deep compression state, the movable clamping tooth block is gradually moved outward, and the tooth grain of the movable clamping tooth block is separated from the tooth grain groove at the bottom of the pin; Step 2, Take out the locking member from the top of the luminous member, then set a rope body of the object to be combined above the first arc splint, and insert two pins at the bottom of the locking member into the inside of a slot at the top of the luminous member; Step 3, During the insertion process, the second arc splint at a bottom of the locking member gradually approaches and contacts the rope body part of the object to be combined until the rod body is compressed, and at this time the third springs are in a compressed state; Step 4, Rotate the screw rod in reverse, so that the screw rod is gradually moved inwardly, and drive the movable clamping tooth block to move inwardly, so that the tooth grain at the end of the movable clamping tooth block is clamped with the tooth grain groove on the pin, and the locking member is completed; the first spring is reset and is in a lightly compressed state; Step 5, After the installation is completed, press the control switch to control the luminous lamps to work to emit light, and the combination device can be used.

* * * * *